March 15, 1966 A. J. SCALORA 3,240,851
METHOD AND APPARATUS FOR SEVERING THERMOPLASTIC MATERIAL
Filed Oct. 26, 1960 3 Sheets-Sheet 2

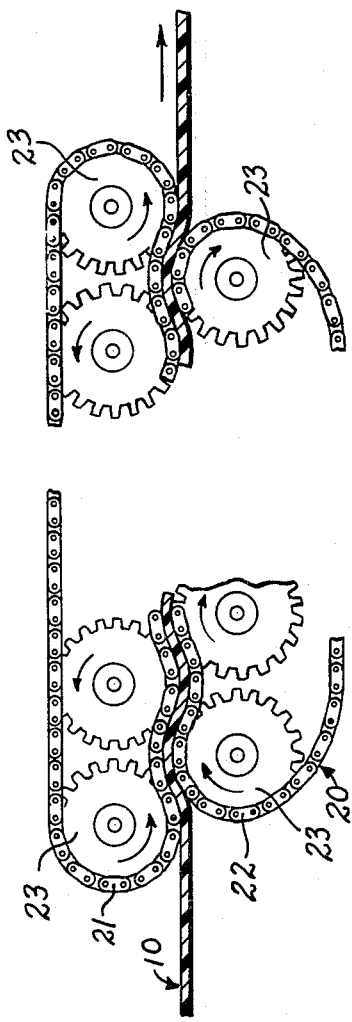
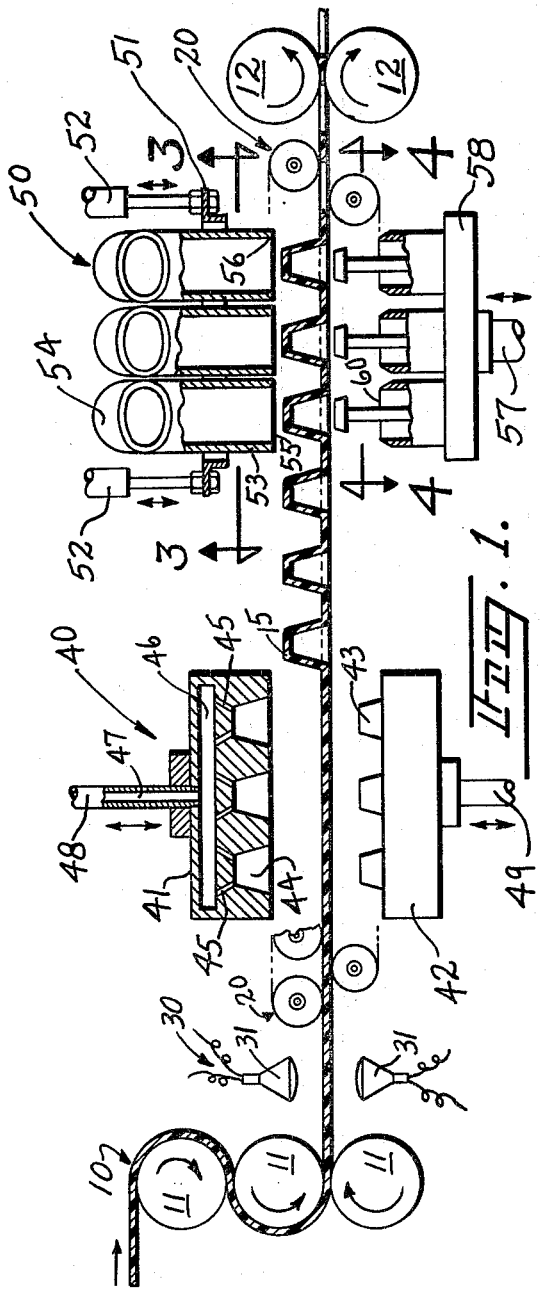

INVENTOR.
ANTHONY J. SCALORA
BY
J. F. TEIGLAND and
CHARLES S. LYNCH
ATTORNEYS

March 15, 1966 — A. J. SCALORA — 3,240,851
METHOD AND APPARATUS FOR SEVERING THERMOPLASTIC MATERIAL
Filed Oct. 26, 1960 — 3 Sheets-Sheet 3
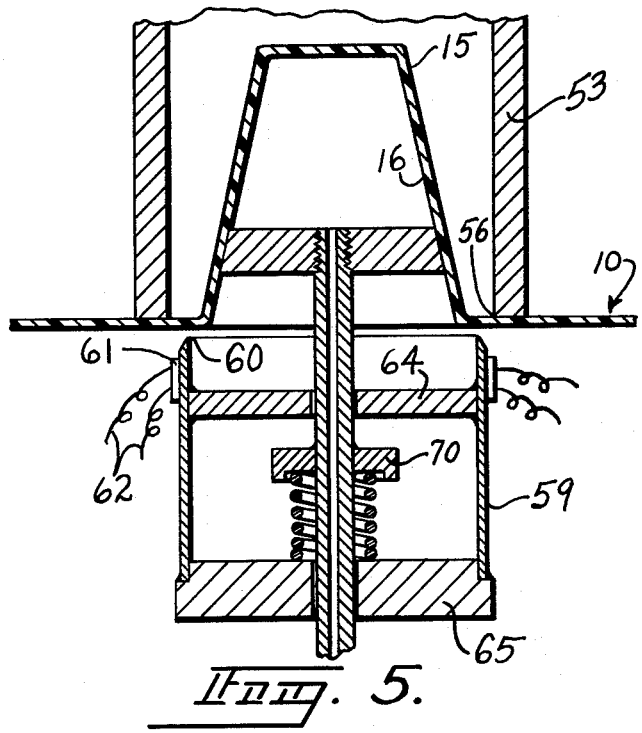
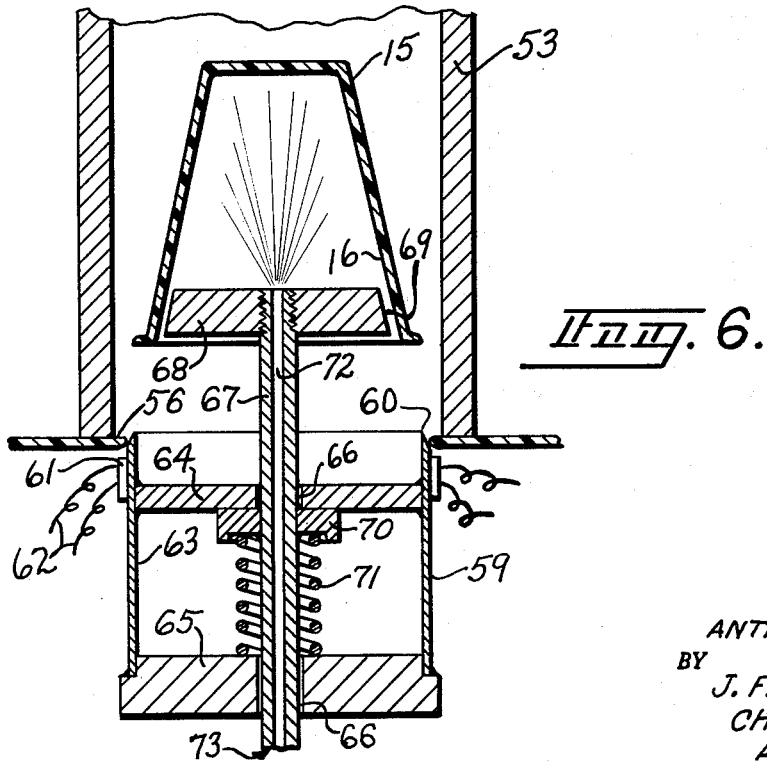
INVENTOR.
ANTHONY J. SCALORA
BY
J. F. TEIGLAND and
CHARLES S. LYNCH
ATTORNEYS United States Patent Office 3,240,851
Patented Mar. 15, 1966

3,240,851
METHOD AND APPARATUS FOR SEVERING THERMOPLASTIC MATERIAL
Anthony J. Scalora, Toledo, Ohio, assignor to Owens-Illinois Glass Company, a corporation of Ohio
Filed Oct. 26, 1960, Ser. No. 65,153
10 Claims. (Cl. 264—153)

This invention relates generally to a method and apparatus for severing formed articles from a sheet of thermoplastic material.

Formed articles, such as containers for example, may be formed of a sheet of thermoplastic material by a number of conventional methods, such as vacuum forming, straight forming, drape forming, or plug assist vacuum forming. The conventional method of separating the formed articles from the sheet is to shear the articles from the sheet by means of a matching punch and die. In using this method, it is essential that the punch and die fit closely in order to avoid producing ragged edges. This is especially important where the severed article is a cup, because a ragged edge or brim is undesirable to the user. The need for these close tolerances in producing a relatively smooth edge results in the need for expensive apparatus, which requires frequent maintenance. Furthermore, the shearing action, which is inherent in this method, produces a knife-like edge which in many applications is undesirable. Also, since the female die must closely conform to the perimeter of the severed article, the severed article is frictionally held within the die, thereby delaying its removal to a packaging area and increasing the cycle time of the operation.

The method and apparatus of my invention are operable to sever formed articles from a parent sheet of thermoplastic material, with the severed edge of the article being smooth and free of protrusions. Briefly, in its preferred embodiment, my invention comprises maintaining a preheated sheet of thermoplastic material in a central plane, and placing a back-up member on one side of the sheet to support it in an area surrounding the formed article, with the area being proximate to, but spaced outwardly from the formed article. A spring loaded arbor, which is adapted to engage the interior wall of the article, is moved against the article to center the article relative to the back-up member and normal to the parent sheet. A heated knife edge is then advanced through the sheet in a zone spaced inwardly from the area in which the parent sheet is supported by the back-up member. The sheet is thus severed by being melted rather than by being sheared, and the melted material along the severed edge flows slightly to form a smooth continuous edge. After the formed article has been severed, fluid under pressure, such as compressed air, is directed against the interior of the article to blow it through the back-up member to a packing area.

Accordingly, it is an object of my invention to provide a method and appartus for severing formed articles from a parent sheet of thermoplastic material, wherein the line of separation or the severed edge is smooth and continuous.

Another object of my invention is to provide a method and apparatus for severing formed articles from a parent sheet of thermoplastic material, wherein the severing operation is performed by a heated knife which is spaced radially inwardly from a back-up member.

A further object of my invention is to provide a method and apparatus for severing formed articles from a sheet of thermoplastic material, wherein the formed article is centered relative to the parent sheet prior to being severed with a heated knife.

A still further object of my invention is to provide a method and apparatus for severing formed articles from a sheet of thermoplastic material, wherein the severed article can be easily and quickly removed to a packing area immediately after it has been severed.

The specific nature of this invention, as well as other objects and advantages thereof, will become apparent to those skilled in the art from the following detailed description taken in conjunction with the annexed sheets of drawings, on which, by way of example only, the preferred embodiment of this invention is illustrated.

In the drawings:

FIG. 1 is a schematic view, partly in section, showing the forming line, including a sizing station, a preheating station, a forming station, and a trimming station;

FIG. 2 is a vertical view, partly broken away, showing the chains for continuously moving a sheet of thermoplastic material through the various stations of the forming line;

FIG. 5 is a vertical sectional view showing a tubular member in place over a formed article and a spring loaded arbor centering the article relative to the parent sheet; and FIG. 6 is a vertical sectional view showing the heated knife in position after severing the formed article, the severed article being propelled upwardly by compressed air.

Figure 3:
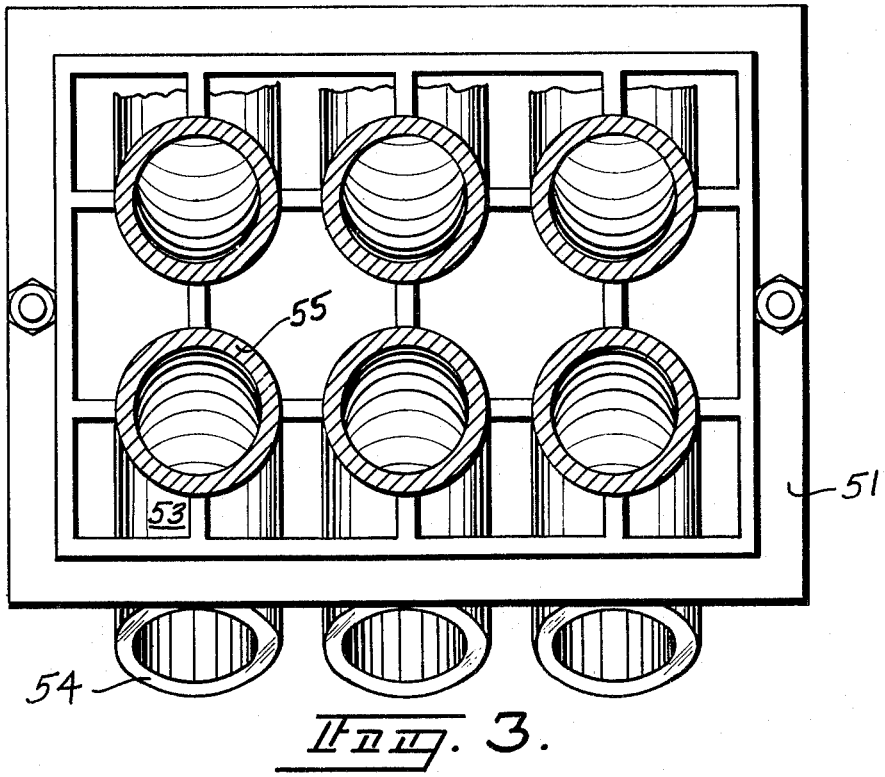
FIG. 3 is a horizontal sectional view taken along the line 3—3 of FIG. 1, showing a plurality of tubular members arranged on a carrier.

Referring to FIG. 1, a sheet 10 of thermoplastic material, such as medium impact polystyrene for example, is continuously fed by means of the feed means 20 through a plurality of stations, including a preheating station 30, a forming station 40, and a trimming station 50. Prior to entering the preheating station 30, the sheet 10 is trained over and between rotatably mounted, heated rolls 11. These rolls 11 comprise conventional sizing and polishing rolls, which serve to size and polish the sheet to give the sheet a desired thickness and surface finish. At the discharge end of the forming line, after the formed articles have been severed from the sheet, the sheet 10 is fed through a second set of rotatably mounted rolls 12, which are arranged to frictionally engage the sheet and discharge the sheet to a waste receptacle (not shown). These rolls 12 can be driven by any suitable conventional means (not shown), such as an electric motor driving the rolls through a spring loaded clutch. In addition to their other functions, these rolls 11 and 12 maintain the sheet taut in a longitudinal direction.

Referring to FIG. 2, the feed means 20 which continuously advances the sheet 10 to the various stations of the forming line, comprises two sets of chains which are horizontally spaced apart to grip the lateral edges of the sheet. Each set of chains comprises upper and lower chains 21 and 22, respectively, which are trained over sprockets 23. These sprockets 23 are arranged to hold the chains 21 and 22 in spaced apart relationship, a distance somewhat less than the thickness of the sheet. As the sheet 10 moves between the chains 21 and 22 it is pinched and firmly gripped by the chains and made taut in a lateral direction and in a longitudinal direction, and hence maintained in a central plane. As previously mentioned, the sizing rolls 11 and the discharge rolls 12 also aid in maintaining the sheet taut in a longitudinal direction. The chains 21 and 22 can be driven by any suitable conventional means (not shown) such as an electric motor operatively connected to drive one or more of the sprockets 23.

The preheating station 30 is schematically illustrated in FIG. 1 by a pair of heat lamps 31. The preheating station 30 serves to raise the temperature of the sheet of thermoplastic material to the proper forming temperature. The proper forming temperature will vary depending on the composition of the thermoplastic material and the type of forming operation. It is to be understood, of course, that the preheating station can be any one of several conventional heating means, such as an oven or infrared lamps. In some instances where the sheet is to be formed immediately after being extruded, the sheet can be at the correct forming temperature and the preheating station is not required.

The forming station 40, as schematically illustrated in FIG. 1, comprises conventional plug assist vacuum forming apparatus. The apparatus comprises upper and lower platens or carriages 41 and 42, respectively, which are mounted for vertical movement, normal to the sheet, and horizontal movement, parallel to the direction of the movement of the sheet. The lower carriage 42 carries a plurality of male plugs 43. The upper carriage 41 carries a plurality of cavities or molds, which are somewhat deeper than the length of the plugs 43. The innermost or bottom surfaces of the cavities 44 are connected by means of a series of ports 45 to a vacuum chamber 46. Conventional means (not shown) are connected to this chamber 46 by a conduit 47 to provide, when desired, a vacuum within said chamber. In operation, the upper and lower carriages 41 and 42 are moved vertically against the sheet and horizontally in a direction parallel to the direction of travel of the continuously moving sheet 10. The sheet 10, which has been heated to the correct forming temperature, is stretched into the cavities 44 by the plugs 43. A vacuum is then formed in the remaining portions of the cavities. The formation of the vacuum draws the pre-stretched sheet completely into the cavities to form the articles 15. The plug and cavity illustrated are representative of the plug and cavity used to form a container, such as a cup. It is to be understood, of course, that the formed articles can be formed on the sheet 10 by several other conventional means, such as vacuum forming, straight forming using a matching plug and die, or drape forming. In conventional apparatus forming these operations, the sheet can be continuously or intermittently advanced. My invention can be used with any of these conventional types of apparatus, including the apparatus which has been previously described.

After the articles 15 have been formed on the sheet 10, the sheet continues to advance to the trimming station 50. The trimming station 50 is the station that relates primarily to my invention.

Figure 4:
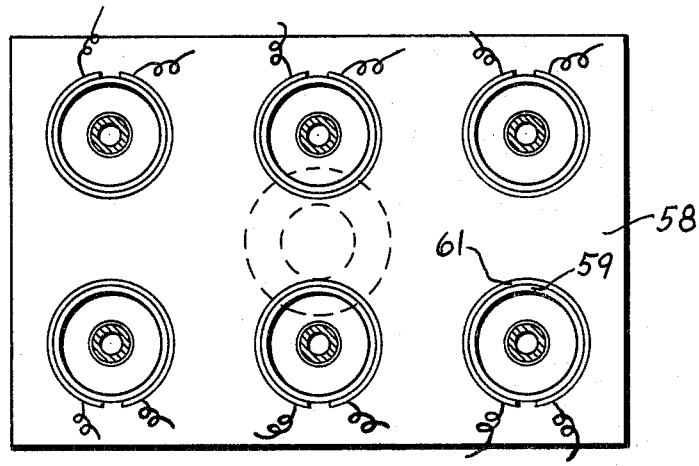
FIG. 4 is a horizontal sectional view along the line 4—4 of FIG. 1, showing a plurality of heated knives arranged on a carrier.

Referring to FIGS. 1, 3 and 4, the trimming station 50 comprises an upper platen or carrier 51 which has symmetrically arranged and affixed thereto six tubular members 53, each tubular member 53 is essentially a section of tubing which is curved over its upper end to form a dispensing opening 54. The lower end of the tubular member, which forms a back-up member or plate 55, is sized to encircle the formed article 15. The inner peripheral edge 56 of the back-up member or plate 55 is shaped to generally follow the desired line of severance between the formed article and the sheet 10, but is made sufficiently large to fit outside the line of severance or the desired perimeter of the formed article. In practice, I have found that the inner peripheral edge 56 of the tubular member can be spaced 1/16 to 1/8 inch from the desired line of severance. It is preferable that the inner peripheral edge of the back-up member be located no closer than the thickness of the sheet to the line of severance to eliminate any tendency to shear the sheet.

The lower carrier 58 (FIG. 4) carries a plurality of knives 59 which have a knife edge 60. The knife edge 60 is continuous and shaped to define with the desired line of separation. The knife edge 60 is heated by means of a conventional resistance heating element 61, which is secured to the knife adjacent the knife edge. The heating element 61 is connected by wire 62 to a suitable, conventional, regulatable power source (not shown). The heating element 61 is energized to heat the knife edge 60 to the desired temperature. The desired temperature is one which will allow the knife edge to pass easily through the thermoplastic material without having the thermoplastic material adhere to the knife or having the material pinched or sheared between the back-up member and the knife edge. The temperature of the sheet is a factor in determining the optimum knife edge temperature. A high sheet temperature and a low knife edge temperature will result in pinching or shearing of the sheet and produce a sharp edge on the perimeter of the severed article. A high sheet temperature and a high knife edge temperature will cause material to stick to the knife and will produce needle-like protrusions on the perimeter of the severed article. In using a sheet material of medium impact polystyrene, 0.040 inch thick, I have found that a sheet temperature of 210° F. and a knife temperature of 550° F. produce a satisfactory, smooth, continuous perimeter on the severed article. The proper knife and sheet temperatures for trimming other materials may be easily determined by making a series of routine tests.

On the interior wall 63 of the knife 59 are securely mounted two spaced apart plates 64 and 65. These plates 64 and 65 have aligned guide holes 66. A shaft 67, which has an arbor 68 threadedly secured at one end thereof, extends through the guide holes 66. The outer radial surface 69 of the arbor is contoured to snugly engage the interior wall 16 of the formed article 15. A spring rest 70 is secured, intermediate the plates 64 and 65, to the shaft 67. A compression spring 71 encircles the shaft 67 and bears against the spring rest 70 and one of the plates 65 to thereby resiliently urge the arbor outwardly from the knife edge, until the spring rest contacts the other plate 64. In this manner, the arbor 68 is spring loaded and capable of moving independently of the knife 59.

The shaft 67 is bored out to form a conduit 72 which also extends through the arbor 68. One end 73 of the conduit, that is opposite the arbor, is connected to a supply of fluid under pressure (not shown), such as compressed air.

The upper and lower carriers 51 and 58 of the trimming station are operatively connected in tandem by means of shafts 52 and 57 to the upper and lower carriages 41 and 42 of the forming apparatus. Thus, the upper and lower carriers 51 and 58 are mounted for movement toward each other in a direction normal to the sheet 10, and also a direction parallel to the direction of movement of the continuously advancing sheet 10. It is to be understood, of course, that where the sheet 10 is intermittently advanced, the movement of the upper and lower carriers 51 and 58 need only be normal to the sheet. This is the case where the sheet is intermittently advanced through the forming apparatus or a continuously advancing sheet, with the formed articles thereon, is fed into a loop which provides a back log for intermittently advancing the sheet to a trimming station. Also, in some operations, it may be desirable to sever the sheet to lengths, after the articles have been formed thereon, and to then feed these lengths into a press having upper and lower platens corresponding to the upper and lower carriers 51 and 58 used in the preferred embodiment of my invention.

In operation of the preferred embodiment of my invention the upper carrier 51 is moved downwardly to move the tubular members 53 into contact with the sheet 10. This movement of the upper carrier 51 is tied to the downward movement of the upper carriage 41 of the forming apparatus. Thus, automatic alignment of the tubular members with the formed articles on the continuously advancing sheet is made possible. This is because the upper carrier 51 will also move longitudinally with the sheet in the same manner as the upper carriage 41 of the forming apparatus. Next, the lower carrier 58 is moved upwardly to bring the arbor 68 into contact with the interior wall 16 of the formed article. See FIG. 5. The lower carrier 58 is likewise tied to the lower carriage 42 of the forming apparatus thereby insuring alignment of the arbor 68 with the formed article 15. As lower carrier 58 continues its upper movement, the spring loaded arbor 68 bears against the formed article to center it, normal to the parent sheet and make the sheet taut across the back-up member 55. Continued upper movement of the lower carrier 58 brings the heated knife 59 into contact with the sheet of thermoplastic material to sever it along the desired line of separation. Thus, the heated knife moves through the sheet in a zone spaced inwardly from the inner peripheral edge of the back-up member 55. The separation is made by melting the thermoplastic material, which, as previously described, flows slightly to form a smooth continuous edge or perimeter on the severed formed article. After the article has been severed from the sheet, air under pressure is introduced through the conduit 72 to impinge the interior of the formed article. The compressed air blows the severed article upwardly through the tubular member and out the dispensing opening 54 formed thereon. Since the tubular member 53, including the lower end, which forms the back-up plate 55, is larger than the perimeter of the severed article, the upper movement of the severed article is unrestricted. The dispensing opening 54 is arranged to deposit the severed article in the packing area or on means for conveying the article to a packing area (not shown).

It will, of course, be understood that various details of construction may be modified through a wide range without departing from the principles of this invention, and it is not, therefore, the purpose to limit the patent granted hereon otherwise than necessitated by the scope of the appended claims.

I claim:

1. The method of severing a formed cup-like article from a parent sheet of thermoplastic material which comprises heating said sheet, longitudinally and laterally gripping said sheet to maintain it in a central plane, positively supporting said sheet in an area surrounding said article, said area being proximate to, but spaced outwardly from said article, and advancing a heated knife edge through said sheet in a zone spaced inwardly from said area a distance at least as great as the thickness of said sheet to sever the article from the parent sheet by melting said sheet in said zone to form a smooth continuous perimeter on the severed article.

2. The method of severing a formed article from a sheet of thermoplastic material comprising, placing a back-up member having an opening defined by an inner peripheral edge on one side of said sheet in an area surrounding the formed article, moving a severing member having a heated knife edge into contact with the sheet on the side opposite said one side, and severing said article by advancing said knife edge through said sheet, in a zone spaced inwardly from said inner peripheral edge a distance at least as great as the thickness of said sheet, said knife edge being sufficiently hot to sever said sheet by melting said thermoplastic material.

3. The method of severing a formed article from a sheet of thermoplastic material comprising, placing a back-up member having an opening defined by an inner peripheral edge on one side of said sheet in an area surrounding the formed article, moving a severing member having a heated knife edge into contact with the sheet on the side opposite said one side, and severing said article from said sheet by advancing said knife edge through said sheet in a zone spaced inwardly from the inner periphery of said back-up member a distance at least as great as the thickness of said sheet, said knife edge being sufficiently hot to sever said sheet by melting said thermoplastic material.

4. The method of severing a formed article from a sheet of thermoplastic material, comprising placing a back-up member on one side of said sheet in an area surrounding the formed article, moving an arbor into contact with a portion of said formed article to center said article normal to said sheet, moving a severing member having a heated knife edge into contact with said sheet on the side opposite said plate, and severing said article by advancing said knife edge through said sheet in a zone spaced inwardly from said area a distance at least as great as the thickness of said sheet, said knife edge being sufficiently hot to sever said sheet by melting said thermoplastic material.

5. The method of severing a formed article from a sheet of thermoplastic material, comprising placing a back-up member on one side of said sheet in an area surrounding the formed article, moving an arbor into contact with a portion of said formed article to center said article normal to said sheet, moving a severing member having a heated knife edge into contact with said sheet on the side opposite said plate, severing said article by advancing said knife edge through said sheet in a zone spaced inwardly from said area a distance at least as great as the thickness of said sheet, and blowing said severed article through said plate to remove said article to a packaging area, said knife edge being sufficiently hot to sever said sheet by melting said thermoplastic material.

6. Apparatus for severing along a predetermined line of separation a formed article from a parent sheet of thermoplastic material, comprising a back-up plate having an inner peripheral edge defining an opening, said edge following generally said line of separation but spaced outwardly from said line a distance at least as great as the thickness of said sheet, means for supporting and moving said plate into contact with said sheet, with said opening aligned with said article, whereby said plate will support said sheet in an area surrounding said article, a severing member having a heated knife edge, defining the desired line of separation, said knife edge being sufficiently hot to melt said thermoplastic material, and means for supporting and moving said knife edge through said sheet in aligned relationship with said article, whereby said knife edge will move within said opening and sever the article from the sheet.

7. Apparatus for severing along a predetermined line of separation a formed article from a parent sheet of thermoplastic material, comprising a back-up plate having an inner peripheral edge defining an opening, said edge following generally said line of separation but spaced outwardly from said line a distance at least as great as the thickness of said sheet, means for supporting and moving said plate into contact with sheet, with said opening aligned with said article, whereby said sheet will be supported in an area surrounding said article, centering means for centering said article normal to said parent sheet, a severing member having a knife edge defining said line of separation, means for heating said knife edge to a temperature sufficient to melt said thermoplastic material and means for supporting and moving said knife edge through said sheet in aligned relationship with said article, whereby said knife edge will move freely within said opening and sever the article from the sheet.

8. Apparatus as defined in claim 7, wherein said centering means comprise a spring loaded guide adapted to engage said article and means for moving said guide into contact with said article.

9. The method of severing a formed cup-like article from a parent sheet of thermoplastic material which comprises heating said sheet, longitudinally and laterally gripping said sheet to maintain it in a central plane, positively supporting said sheet in an area surrounding said article, said area being proximate to but spaced outwardly from said article, centering said article normal to said plane, and advancing a heated knife edge through said sheet in a zone spaced inwardly from said area a distance at least as great as the thickness of said sheet to sever said article from the parent sheet by melting said sheet in said zone to form a smooth continuous perimeter on the severed article.

10. Apparatus for severing along a predetermined line of separation a formed article from a parent sheet of thermoplastic material, comprising a back-up plate having an inner peripheral edge defining an opening, said edge following generally said line of separation but spaced outwardly from said line a distance at least as great as the thickness of said sheet, means for supporting and moving said plate into contact with said sheet with said opening aligned with said article, whereby said sheet will be supported in an area surrounding said article, centering means for centering said article normal to said parent sheet, a severing member having a knife edge defining said line of separation, means for heating said knife edge to a temperature sufficient to melt said thermoplastic material, means for supporting and moving said knife edge through said sheet in aligned relationship with said article whereby said knife edge will move freely within said opening and sever the article from the sheet, and means for blowing said severed article through said back-up plate and from said sheet.

References Cited by the Examiner
UNITED STATES PATENTS

| | | | |
|---|---|---|---|
| 1,531,504 | 3/1925 | Roberts. | |
| 2,122,368 | 6/1938 | Engler | 83—16 |
| 2,293,178 | 8/1942 | Stocker | 18—25 |
| 2,580,566 | 1/1952 | MacHenry et al. | 18—19 |
| 2,615,111 | 10/1952 | Paquette | 83—16 |
| 2,620,873 | 12/1952 | Eaton | 83—98 |
| 2,953,814 | 9/1960 | Mumford | 18—19 |

FOREIGN PATENTS

| | | |
|---|---|---|
| 604,133 | 8/1960 | Canada. |

ROBERT F. WHITE, *Primary Examiner.*

CARL W. TOMLIN, ALEXANDER H. BRODMERKEL, *Examiners.*